United States Patent [19]
Harrington et al.

[11] Patent Number: 6,014,226
[45] Date of Patent: Jan. 11, 2000

[54] MULTILEVEL HALFTONING WITH REDUCED TEXTURE CONTOURS AND COVERAGE CONTROL

[75] Inventors: Steven J. Harrington; R. Victor Klassen, both of Webster, N.Y.

[73] Assignee: Xerox Corporation, Stamford, Conn.

[21] Appl. No.: 08/886,742

[22] Filed: Jul. 1, 1997

[51] Int. Cl.[7] .......................... G06K 15/02; H04N 1/405; H04N 1/409

[52] U.S. Cl. .......................... 358/1.9; 358/502; 358/457; 358/458; 358/466; 358/298; 382/270; 382/275

[58] Field of Search .......................... 395/109; 382/237, 382/270, 275; 358/533, 534, 535, 536, 456, 457, 458, 454, 298, 466, 1.9

[56] References Cited

U.S. PATENT DOCUMENTS

| | | | |
|---|---|---|---|
| 4,149,194 | 4/1979 | Holladay | 358/283 |
| 5,045,952 | 9/1991 | Eschbach | 358/447 |
| 5,196,942 | 3/1993 | Shiau | 358/298 |
| 5,226,094 | 7/1993 | Eschbach . | |
| 5,444,551 | 8/1995 | Miller et al. | 358/456 |
| 5,542,029 | 7/1996 | Karlsson | 358/1.9 |
| 5,592,592 | 1/1997 | Shu | 358/1.9 |
| 5,742,405 | 4/1998 | Spaulding et al. | 358/456 |
| 5,799,137 | 8/1998 | Broddin et al. | 358/1.9 |

FOREIGN PATENT DOCUMENTS

| | | |
|---|---|---|
| 740 459 A2 | 10/1996 | European Pat. Off. . |
| 2 091 518 | 7/1982 | United Kingdom . |

OTHER PUBLICATIONS

"An Adaptive Algorithm for Spatial Grayscale" by Floyd and Steinberg, Proceedings of the SID 17/2, 75–77 (1976).
"Using Peano Curves for Bilevel Display of Continuous–tone Images", by Witten et al., IEEE Comp. Graph. and App. vol. 2, No. 5, pp. 47–52 (1982).
Naive Halftoning by Cole, Procceings of CGI '90, Springer Verlag pp. 203–222 (1990).

"Three Plus Five Makes Eight: A Simplified Approach to Halftoning" by Wyvill et al., Proceedings of CGI '91 Scientific Visualization of Physical Phenomena, pp. 379–392 (1991).

"Digital Halftoning with Space Filling Curves" by L. Velho et al., Computer Graphics, vol. 25 No. 4, pp. 81–90 (1991).

"Transmission of Gray Level Images by Multilevel Dither Techniques", by Pirsch and Netravali, Computers & Graphics vol. 7, No. 1, pp. 31–44, 1983.

*Primary Examiner*—Scott Rogers
*Attorney, Agent, or Firm*—Alitya Krishnan

[57] ABSTRACT

In this proposal a method of multilevel halftoning is described that allows the definition of halftone patterns using more than two gray levels at a time. This feature can be employed to eliminate the texture contours produced when shades formed by a pattern of two levels blends into a shade formed by a single gray level. The method also gives control over the degree to which a given output gray level is used. This can be employed to limit ink coverage when certain levels require more ink to produce than do others. According to the method: initial pixel intensity ranges are obtained; the initial pixel intensity ranges are compared to at least two overlapping threshold arrays; and selection of enhanced pixel intensity levels are determined for halftone cells according to the comparison results of the initial pixel intensity ranges to at least two overlapping threshold arrays wherein the enhanced pixel intensity levels are a function of results from the comparison.

6 Claims, 6 Drawing Sheets

MULTILEVEL HALFTONING WITH REDUCED TEXTURE CONTOURS AND COVERAGE CONTROL

FIELD OF THE INVENTION

This invention is generally related to halftoning and methods and devices which allow multilevel intensity pixels in resulting printed images and, more particularly, to a system and method of limiting textures between shades of gray and limiting area coverage for inks during multilevel halftoning by comparing each pixel value to all corresponding halftone thresholds and using logical levels to reach the desired value.

BACKGROUND OF THE INVENTION

Encoding methods, commonly called halftoning, are used to reduce the number of quantization levels per pixel in a digital image while maintaining the gray appearance of the image at normal reading distance. Halftoning techniques are widely employed in the printing and display of digital images. Halftoning techniques are necessary because the physical processes involved are binary in nature or the processes have been restricted to binary operation for reason of cost, speed-memory, or stability in the presence of process fluctuations. Examples of such processes are: most printing presses; ink jet printers; binary cathode ray tube displays; and laser xerography.

In the digital reproduction of documents, image information, be it color, black, or white, is commonly generated in a raster format where the raster comprises a plurality of continuous tone or gray level pixels, i.e., pixels that are defined by digital values, each value representing a gray level among a number of gray levels. Thus, in an 8 bit system, 256 levels of gray are present, where each level represents an increment of gray between white and black. Each separation includes 256 levels of information and there may be more than 16 million colors defined by a gray raster. Usually, rasters in such a gray level format are unprintable by standard printers. Standard printers print in a limited number of levels, either a spot or a no spot in the binary case, or a limited number of levels associated with the spot, for example, four in the quaternary case. Accordingly, it is a limited number of levels that are printable. Besides gray level information derived by scanning, certain processing techniques such as those described, for example, in U.S. Pat. No. 5,226,094 to Eschbach, may produce gray level data requiring quantization for printing.

A standard method of quantizing gray level pixel values to binary level pixel values is through dithering or screening processes. In such arrangements, over a given area having a number of gray pixels therein, each pixel value of an array of gray level pixels within the area is compared to one of a set of pre-selected thresholds as taught, for example, in U.S. Pat. No. 4,149,194 to Holladay. The effect of such an arrangement is that, for an area where the image is gray, some of the thresholds within the screen matrix will be exceeded, i.e., the image value at that specific location is larger than the values stored in the dither matrix for that same location where the intensity is less than the threshold the pixel is colored black, while the remaining elements are allowed to remain white, dependent on the actual physical quantity described by the data. The effect of the distribution of black and white over the halftone cell is integrated by the human eye as gray. A trade-off is required between the number of gray level increments representable by a screen cell, versus the size or frequency of the cell. While it is desirable to have as many gray levels as possible representable by a screen cell, such a requirement increases the size of the cell until its repetition across an image becomes visible. However, with a smaller cell, which can be repeated at high frequency across a page, only a relatively small number of gray levels can be represented.

Algorithms that convert gray images to binary or other number of level images without repeating patterns exist, and include among them error diffusion, as taught, for example, in "An Adaptive Algorithm for Spatial Grayscale" by Floyd and Steinberg, Proceedings of the SID 17/2, 75–77 (1976). Another more elaborate error diffusion technique is taught by U.S. Pat. No. 5,045,952 to Eschbach. Error diffusion tends to suffer from a characteristic "worming" defect. One method of reducing the worming artifact in an error diffusion process that has been noted is to distribute error along a space filling curve, such as Hilbert, Peano or Murray Curves. See, for example, "Using Peano Curves for Bilevel Display of Continuous-tone Images", by Witten et al., IEEE Comp. Graph. and App. Vol 2, No. 5, pp. 47–52 (1982); "Naive Halftoning" by Cole, Proceedings of CGI '90, Springer Verlag pp. 203–222 (1990); and "Three Plus Five Makes Eight: A simplified Approach to Halftoning" by Wyvill et al., Proceedings of CGI '91 Scientific Visualization of Physical Phenomena, pp. 379–392 (1991). Unfortunately, space filling curves present complex processing order, see, for example, "Digital halftoning with Space Filling Curves" by L. Velho et al., Computer Graphics, Vol. 25 No. 4, pp. 81–90 (1991), while, in view of the operation of printers and most image processors, it would be highly desirable to work in scan line order. Error diffusion is often unusable by certain reproduction processes, such as electrophotography, because it tends to produce isolated spots that are not reproducible. In such cases, screening is used with threshold sets arranged to cluster spots together into larger printable dots. Error diffusion is also an inherently sequential process that does not lend itself to parallel processing, while screening.

It is apparent that halftoning is a well known method for rendering continuous tone images on two-color (e.g. black-and-white) devices—the idea being to produce a gray shade by printing a pattern of black and white spots. There are, however, devices that can produce a number of levels that are still limited, but greater than two levels. For example some display monitors that can produce 4 or 8 graylevels have been built, and an ink-jet printer can print with 4 shades of gray ink. Halftoning has been generalized to support these multilevel devices and a scheme that does this is described in a paper by Pirsch and Netravali entitled "Transmission of Gray Level Images by Multilevel Dither Techniques", Computers & Graphics, Vol. 7, No. 1, pp. 31–44, 1983. Their method constructs gray shades from patterns of two adjacent levels; thus, light shades are produced by patterns of white paper and the lightest gray level. These patterns handle the shades down to the shade produced by entirely covering the area with the light gray level. Darker colors are produced by patterns of the lightest gray level and the next darkest gray level. This scheme is illustrated in FIG. 1 of this disclosure (labeled as prior art).

The multilevel halftoning implementation most related to this disclosure is described in U.S. Pat. No. 5,196,942 to Shiau. Shiau includes computation and propagation of a halftone cell error term. Shiau compares the intensity value of a pixel to a halftone threshold and uses the decision to decide whether further comparisons are needed or if the appropriate gray level has been found. However, Shiau does not mention how one should choose halftone thresholds nor how the technique can be employed to control textures and/or coverage. Control over how much of a given level is used is necessary in the case of ink-jet printing where some gray levels are produced by overprinting of two gray inks. While overprinting may produce a useful level of gray it also places twice as much ink on the paper. When there is too much ink there are problems of bleed, bloom, and cockle.

While the prior art attempts have accomplished halftoning, techniques that can accurately construct patterns from more than two gray levels at a time during multilevel halftoning are lacking. It is therefore an object of the invention to provide a method that can achieve such construction resulting in the minimization of texture contours and the ability to control the halftoning level achieved.

All of the references cited herein are incorporated by reference for their teachings.

SUMMARY OF THE INVENTION

In order to achieve the foregoing and other objects, and to overcome the shortcomings discussed above, a method of multilevel halftoning wherein patterns from more than two gray levels at a time can be constructed and controlled is presented. The invention offers an improvement over prior art halftoning techniques that can construct patterns from more than two gray levels at a time. This versatility can be used to remove the texture contours that occur when moving from a shade produced by a mixture of two levels to a shade produced by a single level. The method can also be used to control how much of a given level is used. This method can be useful in the case of overprinting where, as discussed in the Background, problems of bleed, bloom, and cockle need to be greatly reduced. The Halftoning extension can limit the use of given gray levels and can thereby reduce the ink coverage due to levels produced by overprinting.

The method of the invention comprises:

A method of multilevel halftoning that allows the definition of halftone patterns using more than two gray levels at a time. This feature can be employed to eliminate the texture contours produced when shades formed by a pattern of two levels blends into a shade formed by single gray level. The method also gives control over the degree to which a given output gray level is used. This can be employed to limit ink coverage when certain levels require more ink to produce than do others.

The method can be carried out in a hardware environment or with a microprocessor programmed to implement texture and coverage control during multilevel halftoning operations by obtaining a pixel intensity, comparing said pixel intensity to at least two overlapping threshold arrays, and selecting an enhanced pixel intensity level for a halftone cell according to comparison results of said pixel intensity to said at least two threshold arrays wherein the enhanced pixel intensity level is a function of results from the comparison.

The advantage of the invention are: the reduction of bleed, bloom and cockle resulting from overprinting techniques directed at producing useful gray levels; accurate construction of patterns from more than two gray levels at a time during multilevel halftoning resulting in the minimization of texture contours and the ability to control the halftoning achieved; and simple implementation of the invention through software or hardware technologies.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

In conventional halftoning the halftone pattern is defined by an array of thresholds. This array is called the halftone cell and is replicated to cover the entire image so that each pixel of the image has a corresponding threshold. The intensity at each pixel is compared to the threshold at the corresponding location in the array and if it is darker than the threshold the pixel is shaded black, otherwise it is white. In programming this would be represented as follows:

if (Image [x][y]<Threshold [x % cellSizeX][y % cellSizeY])

Pixel[x][y]=black;

else Pixel[x][y]=white;

where the % symbol indicates the remainder operator as in the C programming language; cellSizeX and cellSizeY describe the dimensions of the halftone threshold array.

For a uniformly spaced set of thresholds, the threshold values (on a scale of 0 to 1) are given by:

(2*$I$+1)/(2*cellSizeX*cellSizeY)$I$=0, 1, 2, . . . (cellSizeX*cellSizeY-1).

In the Pirsch and Netravali multilevel technique, there are M possible gray levels, then there are M−1 halftone threshold arrays. The thresholds of the first array are given by:

(2*$I$+1)/((2*cellSizeX*cellSizeY)*(M−1))$I$=0, 1, 2, . . . (cellSizeX*cellSize y-1).

The second threshold matrix can be found by adding 1/(M−1) to the first. The third by adding 2/(M−1) to the first and so on.

To perform multilevel halftoning, it should first be determined which halftone cell to use. If the pixel intensity is in the range 0 to 1/(M−1), the first array is used to decide between the darkest and next darkest levels (L0 and L1). If the intensity is in the range 1/(M−1) to 2/(M−1), the second array is used to halftone between the next two levels (L1 and L2), and so on for the entire range of intensity values. To aid the description of the invention, consider ordering the positions of the halftone array according to their threshold values and plotting the values against position.

Figure 1:
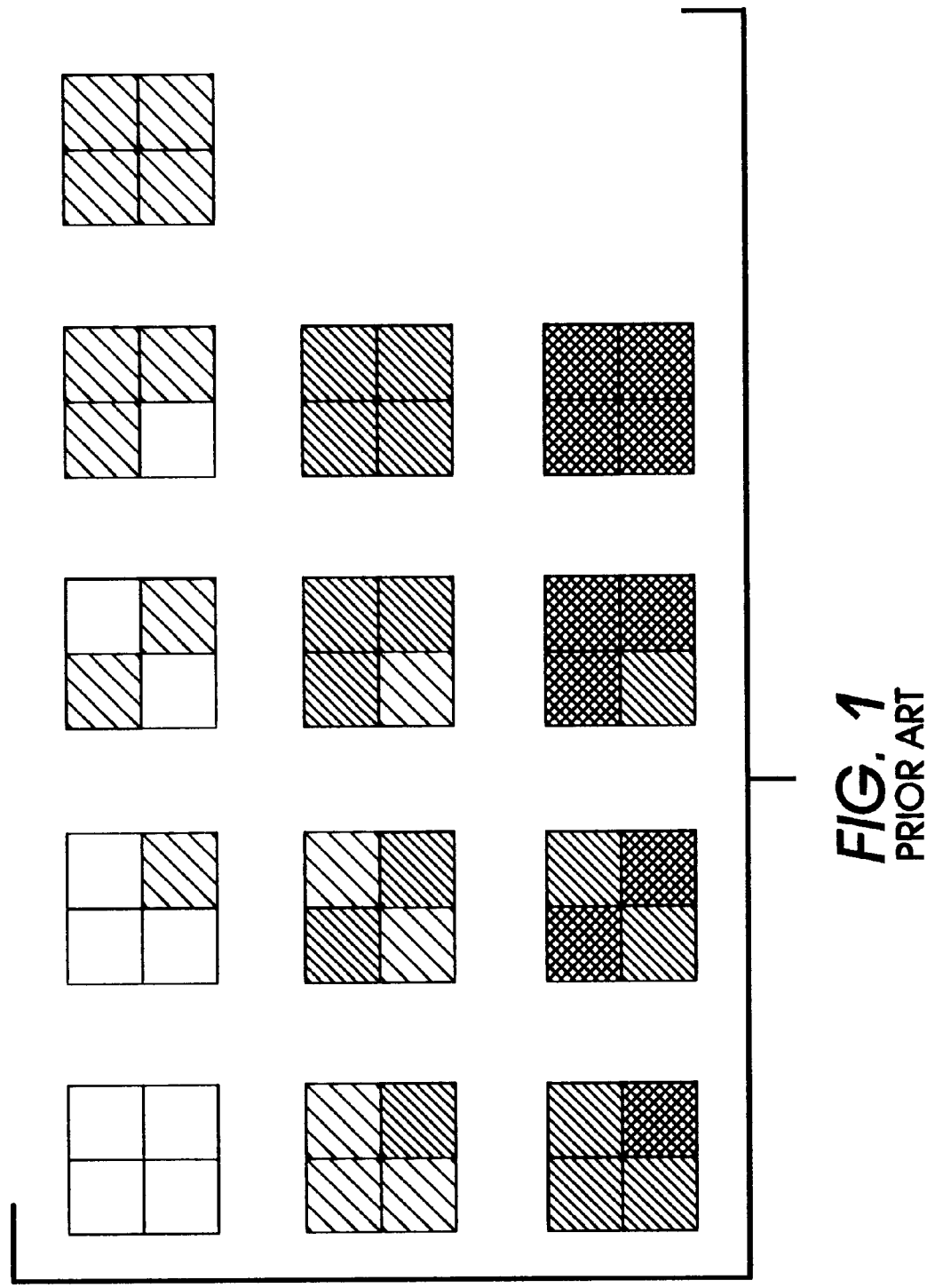
FIG. 1 is a depiction of prior art multilevel halftoning.
Figure 2:
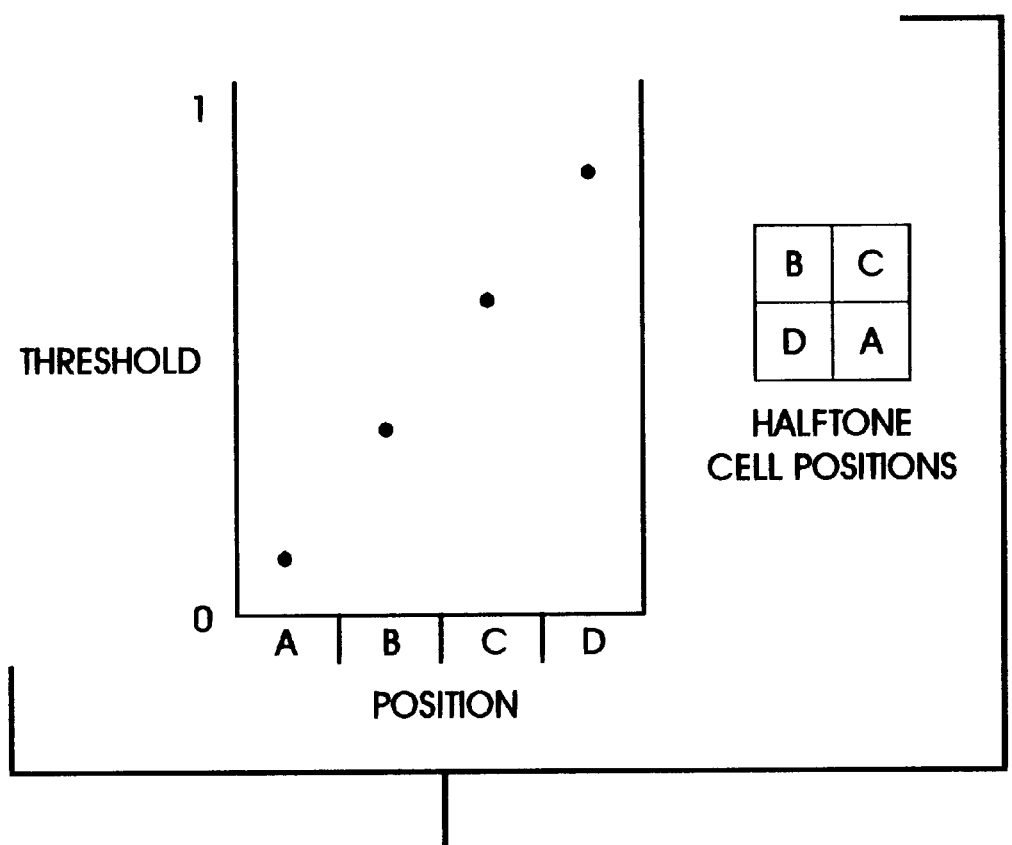
FIG. 2 is a diagram plotting threshold against position for halftone cells.
Figure 3:
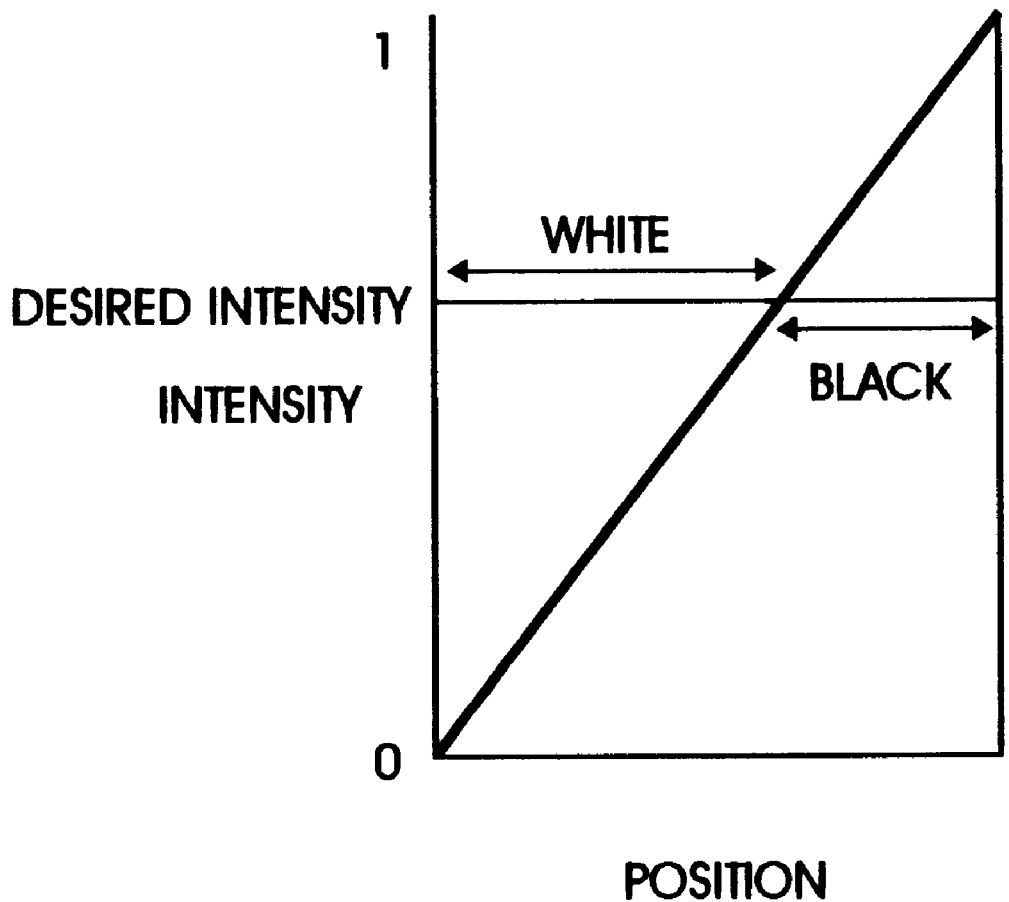
FIG. 3 is a diagram for conventional halftoning processes.

Referring to FIG. 2, if the plotted points are connected with a line, the diagram can be used to describe the halftoning process. Typically, to determine the halftone pattern for a given intensity level a horizontal line is drawn at that position on the vertical axis. Referring to FIG. 3, the pixels corresponding to the portion of the horizontal line to the left of its intersection with the diagonal will be white and those to the right will be black. This will only hold in uniform regions; in regions of varying intensity, partial dotting makes this only approximate.

Figure 4:
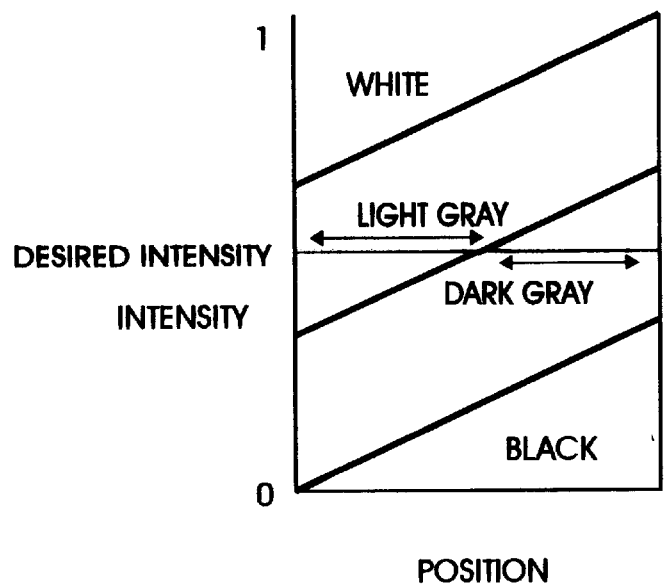
FIG. 4 is a diagram of prior art multilevel haltoning processes.

In a typical multilevel case there are several diagonal lines that divide the diagram into regions for each of the levels. A horizontal line at the desired intensity shows which pixels receive which level. This can be seen in FIG. 4, which illustrates the typical prior art case of four levels (white, light gray, dark gray and black). The horizontal line shows that this particular intensity can be constructed by a pattern of light gray and dark gray. The diagonal lines in the multilevel scheme are positioned such that when one line ends the next begins. This means that there are at most two regions crossed by any horizontal line so there will be at most two gray levels in any halftone pattern. Note that for the particular intensities where one boundary ends and a second begins, a horizontal line will only intersect a single region. This is where the desired intensity matches the gray level and it is therefore produced by printing that level at every pixel. This can result in texture contours in images that sweep from a region shaded by a pattern of two levels to a region shaded by a single level.

Figure 5:
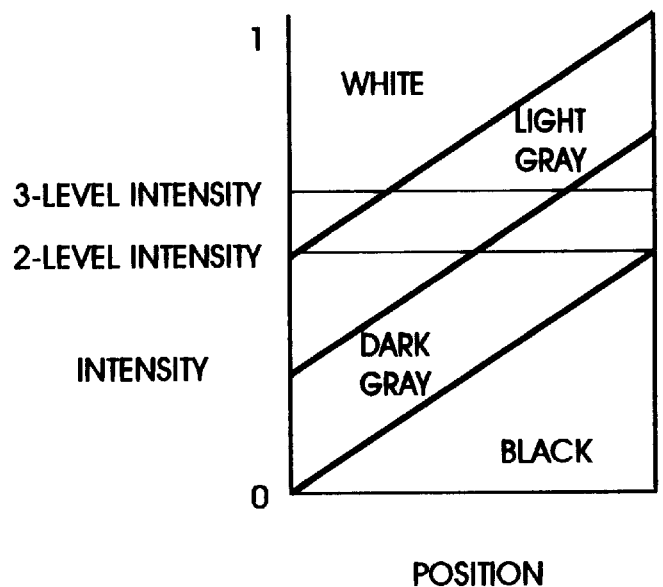
FIG. 5 is a diagram for three-level haltoning incorporating the teachings of this disclosure.

The boundary lines need not be adhered to during multilevel halftoning, as will be apparent from the teaching of this invention. Referring to FIG. 5, the slopes and intercepts of the boundary lines can be altered such that three or more regions are crossed by horizontal lines. This can be used to reduce texture contours as follows: The boundaries can be positioned so that shades are normally produced by combinations of three gray levels. Then, at intensities where a boundary ends the patterns will involve two-level patterns. The texture transition from three-level patterns to two-level patterns is less visible than that from two-level patterns to one uniform level.

Figure 6:
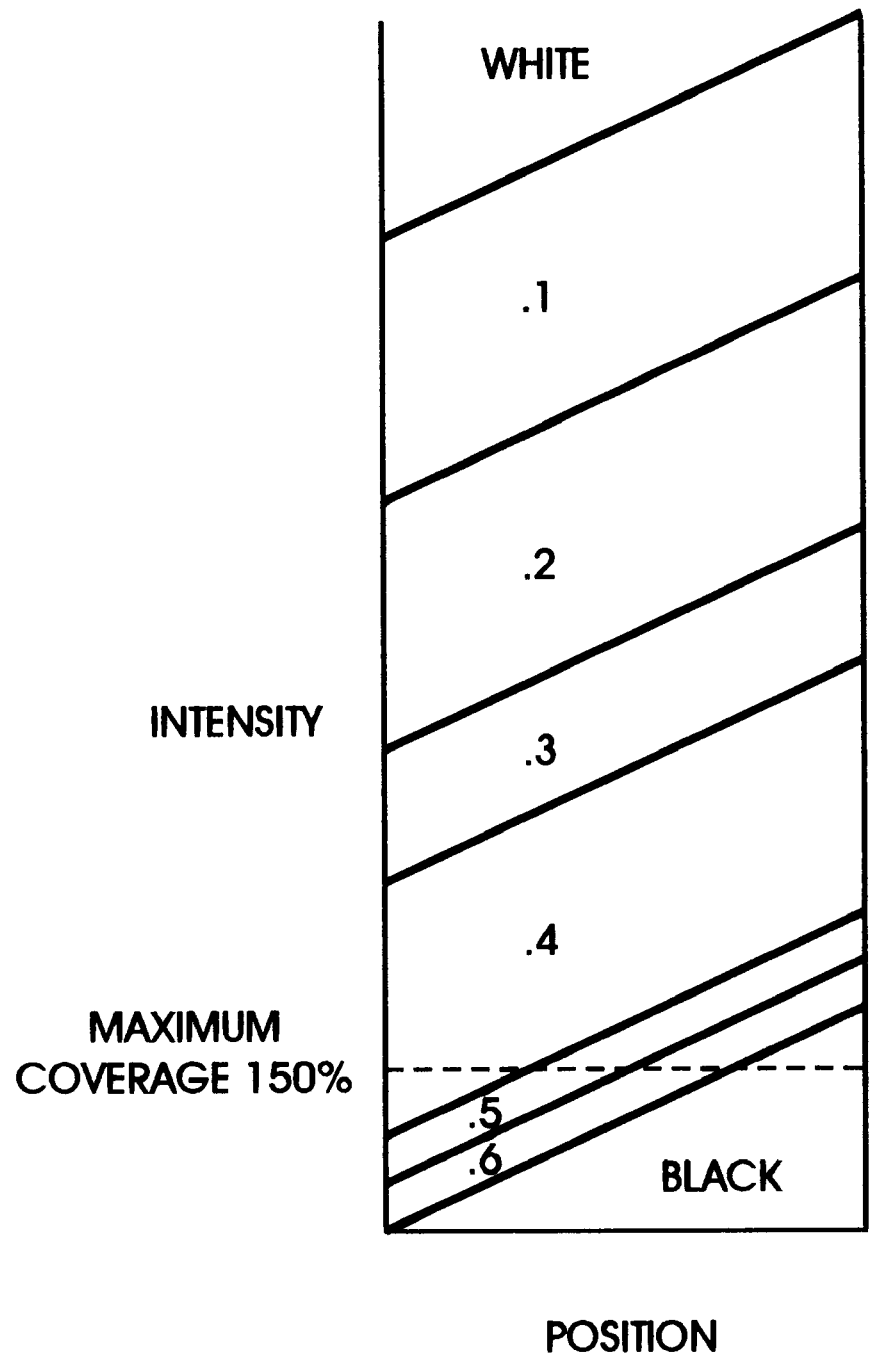
FIG. 6 is a diagram illustrating boundaries for coverage limiting.

The flexibility in boundary positioning can also be used to control ink coverage during document rendering or printing. For example, an ink-jet printer might have three gray inks with densities 0.1, 0.2, 0.4, and black. Overprinting two gray inks can give densities 0.3, 0.5, and 0.6. To limit coverage of the overprinting inks the boundaries may be arranged as shown in FIG. 6.

The amount of a given level that is used is proportional to the width of its corresponding region in the diagram. By arranging the boundaries such that the regions are thin for the levels produced by over-printing, use of these levels is limited as is ink coverage. Changing the slope of the boundary line corresponds to changing the choice of threshold levels. For linear boundaries the thresholds of the first array would be given by $$K*(2*i+1)/((2*cellSizeX*cellSizeY)*(M-1)) i=0, 1, 2, \ldots (cellSizeX*cellSizeY-1)$$

where the parameter K determines the slope.

To change the vertical positioning of boundaries we change the offset between the corresponding values of two threshold arrays. For example, instead of constructing the second array by adding $1/(M-1)$ to the values of the first array we can add some other value. This changes the relative positions of the boundary lines corresponding to the two arrays.

Note that this view of the halftoning process allows even more generally than discussed so far. The boundaries need not be straight lines, and the boundary contours need not all be the same shape. All that is required is that the boundaries do not intersect. It is also preferred that they do not leave gaps where, for a range of vertical positions, no boundaries are crossed.

Note that when the boundary positions are re-adjusted, or when the gray levels are not linearly spaced, there may not be a linear correspondence between the actual intensity produced and the vertical position in the diagram (although the relationship will be monatonic). This means that a compensating tone reproduction curve (TRC) correction should be imposed before halftoning. Of course this is normally required because no printer behaves ideally.

Note also that this method is independent of the actual positioning of the threshold within the halftone cell. Thus it will work with any dot shape.

In order to implement this halftoning method that has been described graphically, the technique of Pirsch and Netravali needs to be modified. Pirsch and Netravali first determine which halftone array to use by examining the pixel intensity and then apply the threshold comparison. That will not work in the general case because several threshold arrays may apply to a given intensity. What should be done instead is to compare the pixel to all the threshold arrays and then use the results of these comparisons to decide on the proper level to print. Number the threshold arrays with array 0, the first array (the boundary for the black region). Then the comparison of a pixel value with the $z^{th}$ array yields a bit value according to the following:

If (Image[x][y]<Threshold[z][x % cellSizeX][y % cellSizeY])

B[z][x][y]=0;

else B[z][x][y]=1;

If B[0][x][y] is 0 then Pixel [x][y] should be painted level L0 (black).

If B[0][x][y] is 1 and B[1][x][y] is 0, then it should be shaded with level L1. Similarly, if B[z−1][x][y] is 1 and B[z][x][y] is 0, then pixel[x][y] should be shaded level Lz. At the high end, if B[M−1][x][y] is 1, then it should be shaded $L_M$ (white).

Figure 7:
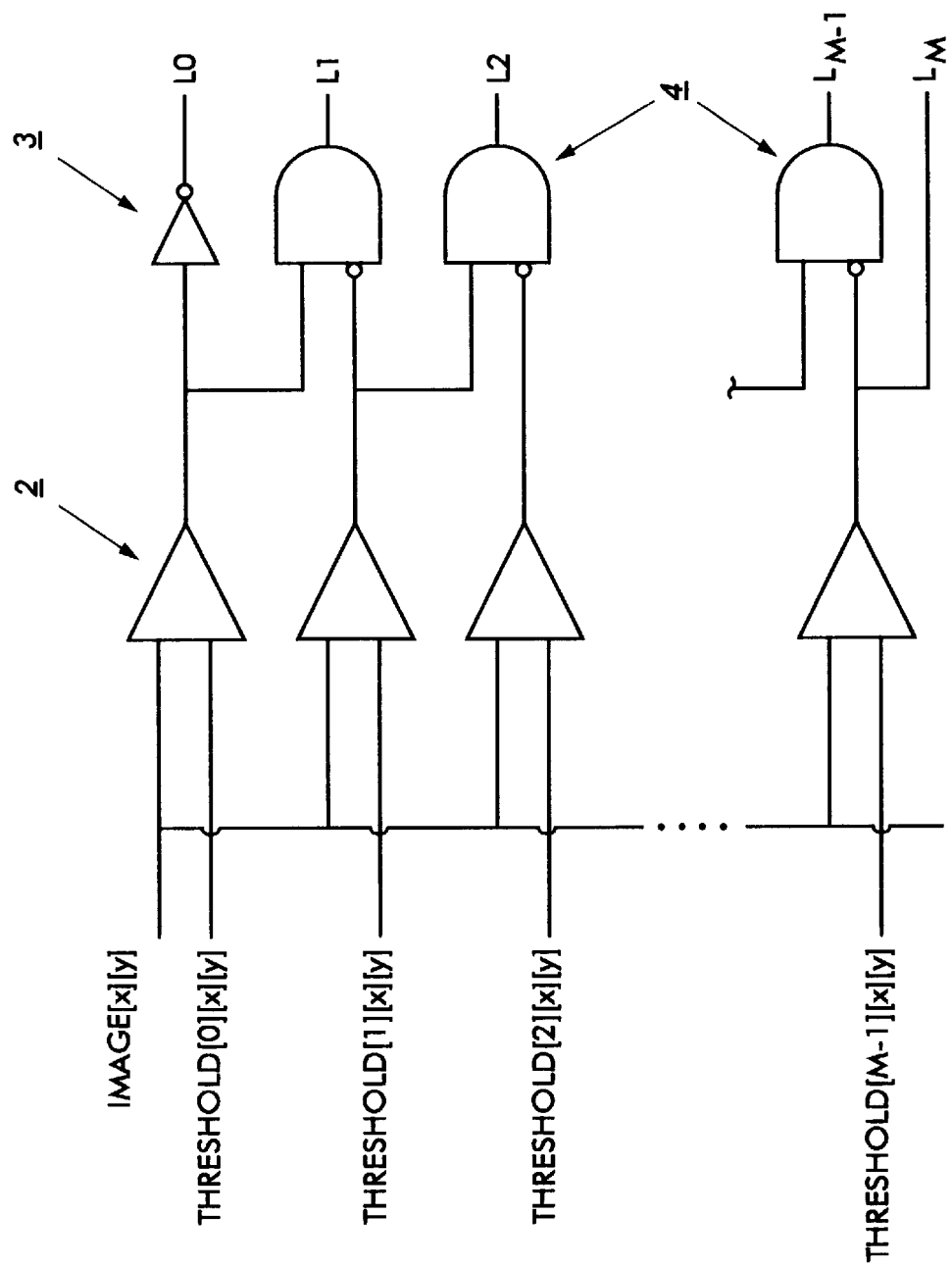
FIG. 7 is a block diagram of a hardware configuration of the invention for the present multilevel halftoning invention.

This process of comparing all thresholds and selecting the appropriate level can be easily implemented in hardware as shown in FIG. 7. Alternatively, the entire process can be implemented in a computer using look-up tables, triply indexed by cell position and intensity. Such an implementation is more efficient for microprocessors using software.

Referring to the hardware configuration of FIG. 7, each pixel value, represented by IMAGE[x][y], is compared to all corresponding halftone thresholds and logical operations used to resolve the proper halftoning level. The value of a pixel is compared to the set of threshold values for the pixel by the column of comparators 2. Thresholds are assigned in ascending order (lowest Threshold [0][x][y], highest Threshold [M−1][x][y]). If the pixel value is less than Threshold [0][x][y] then the comparison will be false and the invertor circuit 3 will make L0 true. The comparisons with all other Thresholds will be false which will provide a true signal from the inverted input to the corresponding AND gate 4, however the other input will be false and the resulting values L1 through $L_M$ will be false. If the pixel value is greater than Threshold [N][x][y] but less than Threshold[N+1][x][y] for some N, then comparisons for Thresholds between 0 and N inclusive will be true and the invertor 3 or inverted AND gate inputs 4 will yield false values for L0 through $L_N$. The comparison with Threshold [N+1][x][y] will be false which is inverted and ANDed with the true signal from the comparison with Threshold[N][x][y] to make $L_{N+1}$ true. The values $L_{N+2}$ through $L_M$ will be false because their AND gates receive false signals from the comparison of the next lower Threshold. Thus only one L value is active at a time, and it is the value corresponding to the Threshold just above the pixel value. Using this method to define halftone arrays and its power in defining proper threshold choices, problems of texture control and coverage control will be overcome. This invention generalizes methods known in the art to allow control of 2, 3 or more of the gray levels in producing the pattern at a given level input.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

We claim:

1. A method of limiting textures between shades of gray and limiting area coverage for inks during multilevel halftoning by comparing pixel values to corresponding halftone thresholds over a pixel intensity range, and using logical levels derived by said comparing to reach said desired pixel values, said corresponding halftone thresholds overlap over the pixel intensity range, wherein:
   initial pixel intensity ranges are obtained;
   said initial pixel intensity ranges are compared to at least two overlapping threshold arrays; and
   selection of enhanced pixel intensity levels are determined for halftone cells according to comparison results of said initial pixel intensity ranges to said at least two overlapping threshold arrays wherein said enhanced pixel intensity levels are a function of results from said comparing.

2. A method for implementing texture and coverage control during multilevel halftoning operations, comprising:
   determining a pixel intensity range;
   comparing said pixel intensity to thresholds in at least two threshold arrays; and
   selecting a pixel intensity level for a halftone cell according to comparison results of said pixel intensity to said thresholds in said at least two threshold arrays wherein said pixel intensity level is a function of said comparison results.

3. The invention of claim 2 wherein said pixel intensity range for said at least two arrays overlap.

4. The invention of claim 3 wherein selecting a pixel intensity is conducted to order a comparison of said pixel intensity range to said at least two threshold arrays and obtain a selection of a pixel intensity level that corresponds to previous unsuccessful comparisons.

5. A microprocessor programmed to implement texture and coverage control during multilevel halftoning operations by:
   obtaining a pixel intensity;
   comparing said pixel intensity to thresholds in at least two overlapping threshold arrays; and
   selecting an enhanced pixel intensity level for a halftone cell according to comparison results of said pixel intensity to said thresholds in said at least two threshold arrays wherein said enhanced pixel intensity level is a function of results from said comparing.

6. The invention of claim 5 wherein said microprocessor's selection of an enhanced pixel intensity is conducted to order a comparison of said pixel intensity range to said at least two threshold arrays and provide a selection of a pixel intensity level that corresponds to previous unsuccessful comparisons.

* * * * *